United States Patent [19]

Toerner

[11] Patent Number: 4,972,970

[45] Date of Patent: Nov. 27, 1990

[54] METHOD AND APPARATUS FOR MOVING BULK MATERIAL THROUGH A CHUTE

[75] Inventor: Ludger Toerner, Eppertshausen, Fed. Rep. of Germany

[73] Assignee: Firma Carl Schenck AG, Darmstadt, Fed. Rep. of Germany

[21] Appl. No.: 296,203

[22] Filed: Jan. 11, 1989

[30] Foreign Application Priority Data

Jan. 12, 1988 [DE] Fed. Rep. of Germany ....... 3800565

[51] Int. Cl.$^5$ ............................................. B65G 47/04
[52] U.S. Cl. ...................................... 222/1; 222/196; 222/200; 366/108; 193/2 B; 198/533
[58] Field of Search ............... 222/196, 199, 200, 226, 222/243, 1; 198/533, 752, 771; 193/2 B; 366/108, 110, 111, 114

[56] References Cited

U.S. PATENT DOCUMENTS

| | | | |
|---|---|---|---|
| 2,801,773 | 8/1957 | Vitkin | 222/200 |
| 3,601,870 | 8/1971 | Jones | 366/108 |
| 3,643,820 | 2/1972 | Hammond | 222/200 |
| 4,346,802 | 8/1982 | Popper | 222/200 |
| 4,475,671 | 10/1984 | McCorkel . | |
| 4,527,747 | 7/1985 | Scharmer et al. . | |

FOREIGN PATENT DOCUMENTS

| | | |
|---|---|---|
| 0083227 | 7/1983 | European Pat. Off. . |
| 1481340 | 4/1970 | Fed. Rep. of Germany . |
| 3408269 | 9/1985 | Fed. Rep. of Germany . |
| 885897 | 1/1962 | United Kingdom . |

Primary Examiner—Joseph J. Rolla
Assistant Examiner—Steven Reiss
Attorney, Agent, or Firm—W. G. Fasse; D. H. Kane, Jr.

[57] ABSTRACT

Bulk material that is difficult to feed, such as glass fibers, is fed from a storage bin into a feeding chute driven by a vibratory drive which vibrates the chute in a longitudinal direction of the chute, that is, in the feed advance direction of the chute. The chute may be a so-called loss-in-weight feeding chute. In order to assure a uniform, constant material flow without any bunching and without any gaps in the flow for an accurate feeding, the material flow is exposed or influenced by a further vibration effective in a direction substantially across the feed advance direction. For the purpose a vibrator with vibrating elements extending in the feed advance direction vibrates in the cross-direction. These vibrating elements are so located that they can make the material flow through the chute more uniform.

12 Claims, 1 Drawing Sheet

METHOD AND APPARATUS FOR MOVING BULK MATERIAL THROUGH A CHUTE

FIELD OF THE INVENTION

The invention relates to a method and apparatus for moving bulk material through a chute. More specifically, the invention has to do with a method for feeding material that is difficult to feed, such as fibrous bulk material, and in particular, glass fibers. The invention also relates to an apparatus for transporting the bulk material.

BACKGROUND INFORMATION

A feeding device for bulk material must transfer the bulk material from a storage bin into a feeding chute equipped with a vibratory drive unit. The chute discharges a fed amount by the vibratory conveying motion of the feeding chute.

In addition to fibrous material, such as glass fibers or carbon fibers, other materials and material compositions of various types are also known to be difficult to feed or to transport as bulk material along a chute vibrating longitudinally. Such products include chemical semi-finished products and finished products, cossettes, flakes, chips, shavings, and the like. With such types of bulk material it is often not possible to maintain a constant and even flow of material on conveyor equipment because such bulk material tends to bunch up or the conveyor unit becomes unevenly loaded because material gets caught or stuck, sticks together, etc. As a result, considerable difficulties often occur when such types of material are to be discharged from a conveyor device. This also applies to vibrating chutes, in which the bulk material is subjected to vibratory motions and is transported in a known manner by means of micro-throw-type motions.

It is known that, for feeding glass fibers, a loss-in-weight-system feeding or weighing scale is used, on which a storage bin for the glass fibers plus a conveyor or feeding chute are arranged. The conveyor or feeding chute discharges the bulk material from the storage bin. The discharge from the feeding chute is controlled in an open or closed loop manner with the aid of an output signal from the loss-in-weight-system or weighing scale.

Many different versions of loss-in-weight-systems or weighing scales for feeding bulk materials are known. Such scales usually comprise a storage bin plus a discharge mechanism, such as a feeding chute supported on a scale or on load cells. In the case of such feeding scales, the reduction in weight that occurs on the scale or on the load cells within a time unit serves to control, in a closed loop manner, the delivery of the bulk material to be fed, from the storage bin.

Since, in spite of the vibrating device, glass fibers do not distribute themselves evenly in the feeding chute, bunching and gaps in the material flow occur repeatedly, making it difficult to discharge the material evenly or to evenly feed the glass fibers. Because of this, attempts have been made to even out the flow of the glass fibers by using guide or distribution devices that dip down into the glass fibers from above. However, such attempts have been only partially successful in conventional devices.

U.S. Pat. No. 4,527,747 (Scharmer et al.) discloses a vibratory chute to which vibration forces are applied in such a manner that the goods passing through the chute tend to follow a helix type revolving motion. This motion is suitable to, for example, separate sand from cast elements. However, the uniform evenly fed transport of bulk materials such as glass fibers is not possible by the application of special forces to the chute. Applying special vibrating forces directly to the bulk material in the chute is not suggested by Scharmer et al.

OBJECTS OF THE INVENTION

In view of the foregoing it is the aim of the invention to achieve the following objects singly or in combination:

to provide a method and an apparatus for an uninterrupted feeding of hard-to-feed bulk material, for example, fibrous material and, in particular, glass fibers;

to create an even flow of bulk material through the chute and thus, enable accurate feeding; and to apply vibratory forces to the bulk material simultaneously in two ways, namely indirectly through the chute, and directly to the bulk material independently of the vibration forces through the chute.

SUMMARY OF THE INVENTION

According to the present method, crosswise effective vibratory motions directly influence the bulk material passing longitudinally through the chute. The present apparatus includes a vibrator for applying longitudinally effective vibration to the chute and an independent vibrating drive which drives a crosswise effective vibrator substantially across the longitudinal feed advance direction through the chute. The crosswise effective vibrator extends at least partially into the bulk material in the chute.

The present method and the present apparatus for performing the method provide a completely even flow of bulk material, with a constant thickness of the layer of material at the delivery or discharge end of the dosing chute. Bunching and gaps in the material are avoided so that an acceptable and uninterrupted feeding of the material is achieved. The short term feeding constancy is improved, i.e., an even feeding is achieved within a short period of time after starting. Furthermore, the invention allows the height of the bulk material to be kept low in the feeding chute.

The invention is suitable for fibrous and other materials that are difficult to feed.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
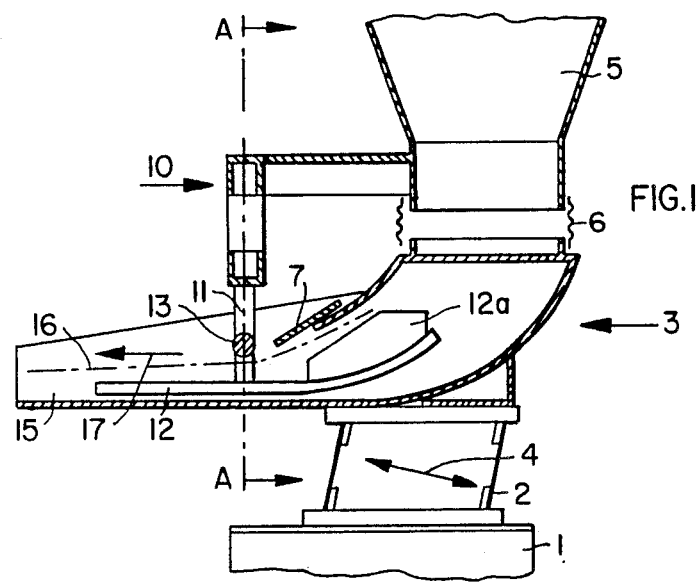
FIG. 1 is a longitudinal section through an apparatus of the invention for feeding, e.g. glass fibers.

FIG. 1 shows schematically a loss-in-weight-system 1. A feeding chute 3 is mounted on the feeding or weighing scale by a spring support 2. The feeding chute 3 is vibrated by a vibratory drive unit not shown in the drawing since it is conventional. The vibratory drive unit generates vibrating motion which acts on the feeding chute 3 in the direction of the double-headed arrow 4.

A supply container 5 is mounted above the feeding chute 3. The storage bin is connected to the feeding chute 3 by means of an elastic connecting sleeve 6 and supported on the feeding scale 1 by means not shown. A baffle plate 7, which determines the height of the flowing bulk material, that is, the height of the bulk material in the feeding chute 3, is arranged in the feeding chute 3. The angle of the plate 7 and its penetration depth into the bulk material may be adjustable. The complete arrangement of the loss-in-weight-system, feeding chute, and the storage bin is conventional so that further details are superfluous.

The invention can also be used on feeding devices without the loss-in-weight-system, that is, it is equally useful for strictly volumetric metering. In such a case, the feeding chute 3 can be fixed to a foundation, for example, and the metering is done by controlling the feeding chute 3 and/or by baffle plates or similarly adjustable means e.g. with a closed loop control.

According to the invention an additional vibratory drive 10 is secure to a fixed point, e.g. the storage bin 5. The drive 10 includes a drive unit 10a, such as a pneumatic vibration exciter supported by the machine frame F, and a spring arrangement 10b, which can be constructed as parallel guides. The upper end of the spring arrangement 10b is fixed to the storage bin 5 by an upper mounting bracket 10c. The lower end of the spring arrangement 10b has a connecting rail 11, securing a lower mounting bracket 10d to a crossbeam 13 holding crosswise effective shaker elements 12.

Figure 3:
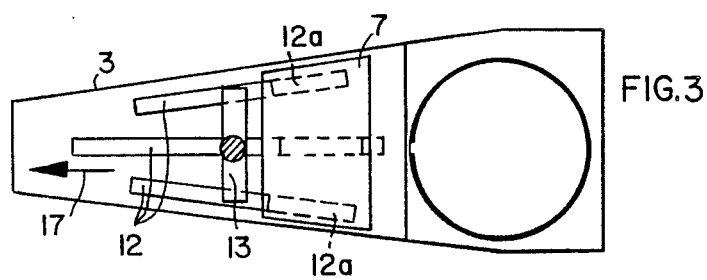
FIG. 3 is a top view of a feeding chute with vibrating shaker elements.

The example embodiment shown comprises three shaker elements 12 connected to one another by said crossbeam 13. The shaker elements 12 range or extend basically in the longitudinal direction in the feeding chute 3, that is, in the direction of bulk material flow or movement, as can be seen in FIGS. 1 and 3. The shaker elements can be rods, or tubes, or strips or the like.

Figure 2:
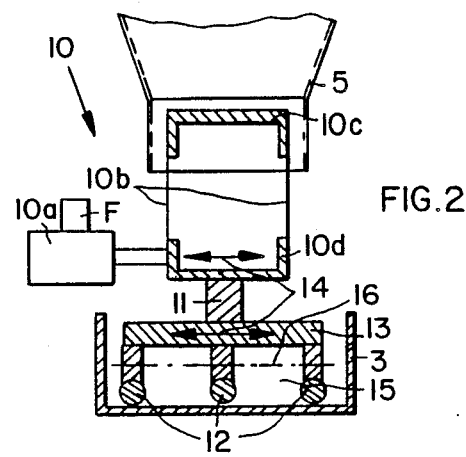
FIG. 2 is a vertical section along section line A—A through the apparatus according to FIG. 1.

The vibratory drive unit 10a may be constructed differently than shown and may be mounted to a fixed frame F, for example. The important feature of the invention is that the vibratory drive unit imparts a crosswise motion, as indicated by the double-headed arrow 14, to the shaker elements 12 basically running in the longitudinal direction of the feeding chute 3. In this embodiment the shaker elements 12 have been so arranged that they move in the material layer 15 or in the surface 16 as indicated by the dotted line in FIGS. 1 and 2. In other words, the shaker elements 12 are completely or partially submerged in the layer of material. For practical purposes, the shaker elements 12 may be arranged so that they are close to the floor of the feeding chute 3. The vibratory drive 10 can be made so that virtually no straight-line motion across the length of the chute 3 results. Instead, the shaker elements 12 may be driven in an elliptical motion, for example, on a vertical or horizontal level. This motion and its drive are independent of any vibratory motion of the chute tending to move the bulk material lengthwise through the chute 3.

The shape of the shaker elements 12 can be adapted to the shape and structure of the feeding chute 3. For example, the shaker elements 12 can be arranged to be basically equi-distant from the floor of the feeding chute. In the trapezoidally shaped feeding chute shown in the top view of FIG. 3, the shaker elements 12 are arranged longitudinally, whereby two laterally outer shaker elements are slightly slanted toward a third central shaker element. The two outer shaker elements slanting toward the center element, extend in parallel to the slanting side walls of the feeding chute 3. It is practical, to arrange the shaker elements 12 basically in the mid-section of the feeding chute 3 as shown in FIGS. 1 and 3. The individual shaker elements 12 can be of varying length as best seen in FIG. 3.

The shaker elements 12 may be equipped with additional flat or rod-shaped members 12a behind or rather below the baffle plate 7, as shown in FIG. 1. Alternatively, the shaker elements themselves may have a flat or rod-shape. Such an arrangement is advantageous because the height of the bulk material in the feeding chute 3 is much higher upstream of the baffle plate 7 than it is downstream of the plate 7. This arrangement loosens up the material in the bunching zone upstream of the baffle plate and prevents the formation of a bridge or a funnel in the bulk material in the bunching zone.

When operating the apparatus of the invention, the bulk material present in the feeding chute 3 is evened out as a result of the superpositioning of the transport motion of the bulk material, which is indicated by the arrow 17 in FIG. 1 and the crosswise motion by the shaker elements 12 as indicated by the double-headed feeding chute shown in the top view of FIG. 3, the shaker elements 12 are arranged longitudinally, whereby two laterally outer shaker elements are slightly slanted toward a third central shaker element. The two outer shaker elements slanting toward the center element, extend in parallel to the slanting side walls of the feeding chute 3.

Although the invention has been described with reference to specific example embodiments, it will be appreciated that it is intended to cover all modifications and equivalents within the scope of the appended claims.

What I claim is:

1. An apparatus for moving bulk material that is difficult to dose, through a vibratable feeding chute, comprising storage bin means for passing a bulk material flow into said vibratable feeding chute, first vibration drive means (4) for vibrating said feeding chute in its longitudinal direction for applying a longitudinally effective vibratory motion through said feeding chute to said bulk material to convey said bulk material flow longitudinally through the chute, crosswise effective vibrating means including at least one vibratable shaker element (12) dipping into said bulk material so that said element is at least partially submerged in said bulk material in said feeding chute, said shaker element extending approximately longitudinally inside said bulk material, and second crosswise vibration drive means (10a) independent of said first vibration drive means of said feeding chute for vibrating said crosswise effective shaker element (12) inside said bulk material to prevent the bulk material from clogging said feeding chute and to flow more uniformly.

2. The apparatus of claim 1, wherein said crosswise effective vibrating means comprise a plurality of crosswise vibrating shaker elements (12) arranged alongside one another, means (13) interconnecting said crosswise vibrating shaker elements (12) to one another, and flexible means (10b) securing said crosswise vibrating shaker elements (12) to said crosswise vibration drive means (10a).

3. The apparatus of claim 2, wherein said plurality of shaker elements are elongated elements, all of which extend into said bulk material forming a spacing between said chute floor and said shaker elements (12).

4. The apparatus of claim 3, wherein said elongated shaker elements comprise three shaker elements, two shaker elements being arranged in said feeding chute at a slant relative to a third shaker element extending centrally in said feeding chute between said two slanting shaker elements.

5. The apparatus of claim 3, wherein said elongated shaker elements are located substantially in a central zone of said feeding chute, said shaker elements forming a unit adapted to the shape of said feeding chute for crosswise vibrating substantially the entire volume of bulk material passing through said feeding chute.

6. The apparatus of claim 2, wherein said flexible securing means (10b) comprise a frame having at least two flexible leaf springs, an upper mounting bracket (10) securing upper ends of said leaf springs to a fixed point, and a lower mounting bracket securing lower ends of said leaf springs to said interconnecting means (11, 13), said vibration drive means being connected to said lower mounting bracket.

7. The apparatus of claim 6, wherein said fixed point is said storage bin for said bulk material.

8. The apparatus of claim 1, further comprising a baffle plate (7) arranged to reach into said feeding chute for guiding said bulk material in said feeding chute, said elongated shaker element reaching at least partially under said baffle plate.

9. The apparatus of claim 8, wherein said elongated shaker elements have upstream ends reaching at least partly into a loading zone of said feeding chute, upstream of said baffle plate as viewed relative to a longitudinal feed advance direction of said bulk material flow.

10. The apparatus of claim 9, wherein said elongated shaker elements comprise substantially upwardly extending extensions (12a) located at least partly below said baffle plate and at least partially in said loading zone of said dosing chute.

11. A method for moving bulk material that is difficult to move, through a feeding chute, comprising the following steps:
 (a) passing a bulk material flow from a storage bin into said feeding chute and vibrating said feeding chute longitudinally in a feed advance direction, for applying a longitudinally effective vibratory motion through said feeding chute to said bulk material,
 (b) dipping at least one shaker element (12) into said bulk material flow so that said shaker element is at least partially submerged in said bulk material in said feeding chute and
 (c) applying a substantially crosswise effective vibratory motion to said shaker element in said bulk material independently of any longitudinal vibration of said feeding chute, whereby said crosswise vibratory motion is effective substantially inside said bulk material flow for preventing said bulk material from clogging said feeding chute and for causing said bulk material to flow through said feeding chute more uniformly.

12. The method of claim 11, wherein said crosswise effective vibratory motion is also applied at least partially near the surface of said bulk material flow.

* * * * *